United States Patent [19]
Garcia et al.

[11] Patent Number: 5,280,591
[45] Date of Patent: Jan. 18, 1994

[54] CENTRALIZED BACKPLANE BUS ARBITER FOR MULTIPROCESSOR SYSTEMS

[75] Inventors: Armando Garcia, Yorktown Heights; Curtis S. McDowell, Thornwood, both of N.Y.; Wielming Sieh, Newton, Mass.

[73] Assignee: International Business Machines, Corporation, Armonk, N.Y.

[21] Appl. No.: 733,563

[22] Filed: Jul. 22, 1991

[51] Int. Cl.⁵ .................................... G06F 13/364
[52] U.S. Cl. ............................ 395/325; 395/725; 364/242.92; 364/DIG. 1; 364/935.41; 364/DIG. 2
[58] Field of Search ............... 395/325, 725, 425, 275; 364/242.92, DIG. 1, 935.41, DIG. 2

[56] References Cited

U.S. PATENT DOCUMENTS

| | | | |
|---|---|---|---|
| 4,009,470 | 2/1977 | Danilenko et al. | 340/172.5 |
| 4,195,343 | 3/1980 | Joyce | 364/200 |
| 4,314,335 | 2/1982 | Pezzi | 364/200 |
| 4,394,728 | 7/1983 | Comfort et al. | 364/200 |
| 4,464,717 | 8/1984 | Keeley et al. | 364/200 |
| 4,484,273 | 11/1984 | Stiffler et al. | 364/200 |
| 4,503,533 | 3/1985 | Tobagi et al. | 370/85 |
| 4,569,985 | 12/1985 | Strecker et al. | 340/825.5 |
| 4,628,447 | 12/1986 | Cartret et al. | 364/200 |
| 4,667,192 | 5/1987 | Schmid et al. | 340/825.5 |
| 4,814,974 | 3/1989 | Narayanan et al. | 364/200 |
| 4,831,523 | 5/1989 | Lewis et al. | 364/200 |
| 4,969,120 | 11/1990 | Azevedo et al. | 364/900 |
| 5,038,276 | 8/1991 | Bozzetti et al. | 395/550 |
| 5,072,363 | 12/1991 | Gallagher | 395/725 |
| 5,088,024 | 2/1992 | Vernon et al. | 395/725 |
| 5,121,487 | 6/1992 | Bechtolsheim | 395/325 |
| 5,151,994 | 9/1992 | Wille et al. | 395/800 |

FOREIGN PATENT DOCUMENTS 0239979 10/1987 European Pat. Off. .

OTHER PUBLICATIONS

IBM Technical Disclosure Bulletin vol. 27, No. 10B, Mar., 1985, pp. 5978-5981 "PROM Programmable Bus Arbitrator".
IBM Technical Disclosure Bulletin vol. 30, No. 10, Mar., 1988, pp. 327-330, "General-purpose Computer Bus Arbitor".

*Primary Examiner*—Allen R. MacDonald
*Assistant Examiner*—Glenn A. Auve
*Attorney, Agent, or Firm*—Perman & Green

[57] ABSTRACT

An Arbiter (36) is coupled to a multiprocessor system (10) Global Bus (24) having two separate main buses: an address bus (ABUS) and a data bus (DBUS). Bus agents coupled to the Global Bus request access to use the buses by asserting bus request lines to the Arbiter. The Arbiter is a dual level, round robin Arbiter that employs a fast, single-cycle arbitration technique. During each system clock cycle, the Arbiter considers the signals on the request input lines and generates corresponding grant output lines which dictate, for the next cycle, which bus agent is to receive access to the address bus and which bus agent is to receive access to the data bus.

20 Claims, 4 Drawing Sheets

CENTRALIZED BACKPLANE BUS ARBITER FOR MULTIPROCESSOR SYSTEMS

CROSS REFERENCE TO RELATED PATENT APPLICATIONS

This patent application is related to the following commonly assigned U.S. Pat. applications: Ser. No. 07/734,432, filed Jul. 22, 1991, entitled "Scientific Visualization System", D. Foster et al. and Ser. No. 07/734,206, filed Jul. 22, 1991, entitled "A Universal Buffered Interface for Coupling Multiple Processors, Memory Units, and I/O Interface to a Common High-Speed Interconnect" A. Garcia.

1. Field of the Invention

This invention relates generally to multiprocessor data processing systems and, in particular, to arbitration apparatus and method for controlling access by system components to system buses.

2. Background of the Invention

System requirements needed to interact with and visualize large, time-dependent data sets include a large, high-bandwidth disk array to store the entire data set being processed, a high speed network to download a problem set, a large, high-speed memory to buffer all data required to process a single simulation time step, computational power that is adequate to manipulate, enhance, and visualize the data sets, and a real-time, high resolution visual display. Furthermore, it is important that these functions be provided within a highly programmable and flexible user environment.

One fundamental problem encountered in multiprocessor systems is the allocation of bus bandwidth amongst the various components, including computational processors, I/O processors, and memory devices (all of which may be collectively referred to as bus agents), to a common high speed interconnect, or global bus.

It is thus one object of the invention to provide a dual level arbitration technique that operates with peripheral devices, processors, and memory devices to control access to a system bus.

Another object of the invention is to provide a dual level, round robin arbitration technique that beneficially load balances fetch and store operations in a multiprocessor system bus.

A further object of the invention is to provide a dual level, centralized Arbiter that employs a modified round robin technique at a highest level so as to provide a memory device requesting access to a system bus a higher priority than processors and I/O devices.

SUMMARY OF THE INVENTION

The foregoing and other problems are overcome and the objects of the invention are realized by circuitry, and a method of operating the circuitry, for allocating address and data buses of a multiprocessor data processing system amongst several bus agents coupled to the buses. A novel two-level round robin arbitration technique is employed to ensure that all bus agents are allocated use of the buses, while preventing either processing or I/O activities of the system to monopolize the buses.

In a presently preferred embodiment the Arbiter is coupled to a multiprocessor system backplane having two separate main buses: an address bus and a data bus. Bus agents coupled to the backplane buses request access to use the buses by asserting request lines to the Arbiter. The Arbiter employs a fast, single-cycle arbitration technique in which, during each system clock cycle, the Arbiter considers the signals on the request input lines and generates corresponding grant output lines which dictate, for the next cycle, which bus agent is to receive access to the address bus and which bus agent is to receive access to the data bus.

In an exemplary embodiment a multiprocessor data processing system has a plurality of groups of bus agents coupled to a common bus. The Arbiter includes a top-level Arbiter for receiving bus requests from the plurality of groups of bus agents. The top-level Arbiter includes a first state machine, operating in accordance with a round robin arbitration technique, for generating a plurality of bus grant signal outputs. Individual ones of the bus grant signal outputs are associated with individual ones of the groups of bus agents. The Arbiter further includes, for each of the groups of bus agents, a bottom-level Arbiter having an input for receiving an associated one of the bus grant signals. Each bottom-level Arbiter includes a second state machine, responsive to the receipt of the bus grant signal and operating in accordance with a round robin arbitration technique, for selecting one of the members of the group for receiving access to the common bus.

A first group of bus agents is disclosed to include at least one computational processor, a second group of bus agents includes at least one I/O processor, and a third group of bus agents includes at least one memory.

In operation, each of the bottom-level Arbiters receives at least one bus request from a member of the associated group and generates a group bus request. The group bus requests include: computational processor read requests (PRREQ), computational processor write requests (PWREQ), I/O processor read requests (IRREQ), I/O processor write requests (IWREQ), and memory response requests (MRREQ).

In response, the top-level Arbiter generates, in accordance with a modified round robin arbitration technique, one or more group bus grant signals. The group bus grant signals include: computational processor read grants (GNT_PR), computational processor write grants (GNT_PW), I/O processor read grants (GNT_IR), I/O processor write grants (GNT_IW), and memory response grants (GNT_M).

In response to the generation of one or more group bus grant signals the bottom-level bus Arbiter or Arbiters generate, in accordance with a round robin arbitration technique, one or more individual bus grant signals for selecting one of the members of the associated group for receiving access to the common bus.

The group bus requests are ordered by the top-level Arbiter in the following priority sequence: PWREQ, PRREQ, IWREQ, and IRREQ. However, the occurrence of a MRREQ is assigned a higher priority than a pending PWREQ, PRREQ, IWREQ, or IRREQ. This technique is shown to provide for enhanced load balancing of the system address and data buses.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
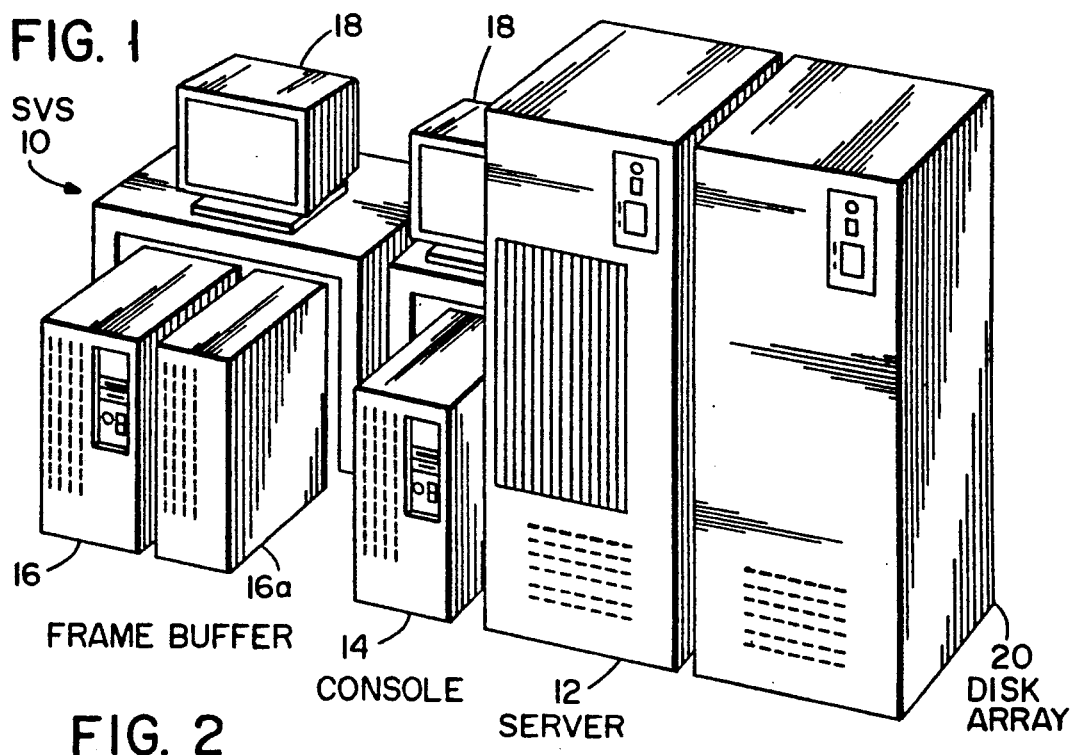
FIG. 1 illustrates system components of a scientific visualization system.

Referring to FIG. 1 there is illustrated a multiprocessor system that employs a two level Arbiter that is constructed and operated in accordance with the invention. Specifically, there are illustrated components of a Scientific Visualization System (SVS) 10. A purpose of the SVS 10 is to process, manipulate, and visualize complex data sets at interactive speeds, although the use of the system 10 is not limited to only this one important application. Furthermore, and as will become apparent, the use of the Arbiter is not restricted to only this particular system. That is, the Arbiter may be employed to advantage in a number of different types of multiprocessor systems.

The SVS 10 includes several major components. A first component is a server 12 embodied within a data processing system that provides large-scale computational power, high-speed memory, and intelligent I/O processors, all of which are interconnected by a high speed global bus. The terms global bus, shared bus, and common interconnect are used interchangeably herein.

A second component is a console 14 embodied in, by example, a RISC System/6000 (RS/6000) data processing system manufactured by the International Business Machines Corporation (RISC System/6000 is a Trademark of the International Business Machines Corporation). The console 14 provides network access from remote workstations (not shown).

A third component is a Frame buffer 16 that includes a RS/6000 data processor which provides console functions therefore. Frame buffer 16 includes interface and image buffering hardware 16a attached via an ANSI standard High Performance Parallel Interface (HIPPI) for providing real-time display capability to high-resolution displays 18. A further component of the system 10 is a disk array 20. Disk array 20 may be embodied within a storage system having 21 GByte capacity with 55 MByte/second transfer rate via a HIPPI interface.

It should be realized that the exact configuration of the system 10 varies depending on the intended use and that the configuration of FIG. 1 is not intended to represent a limitation upon the practice of the invention.

Figure 2:
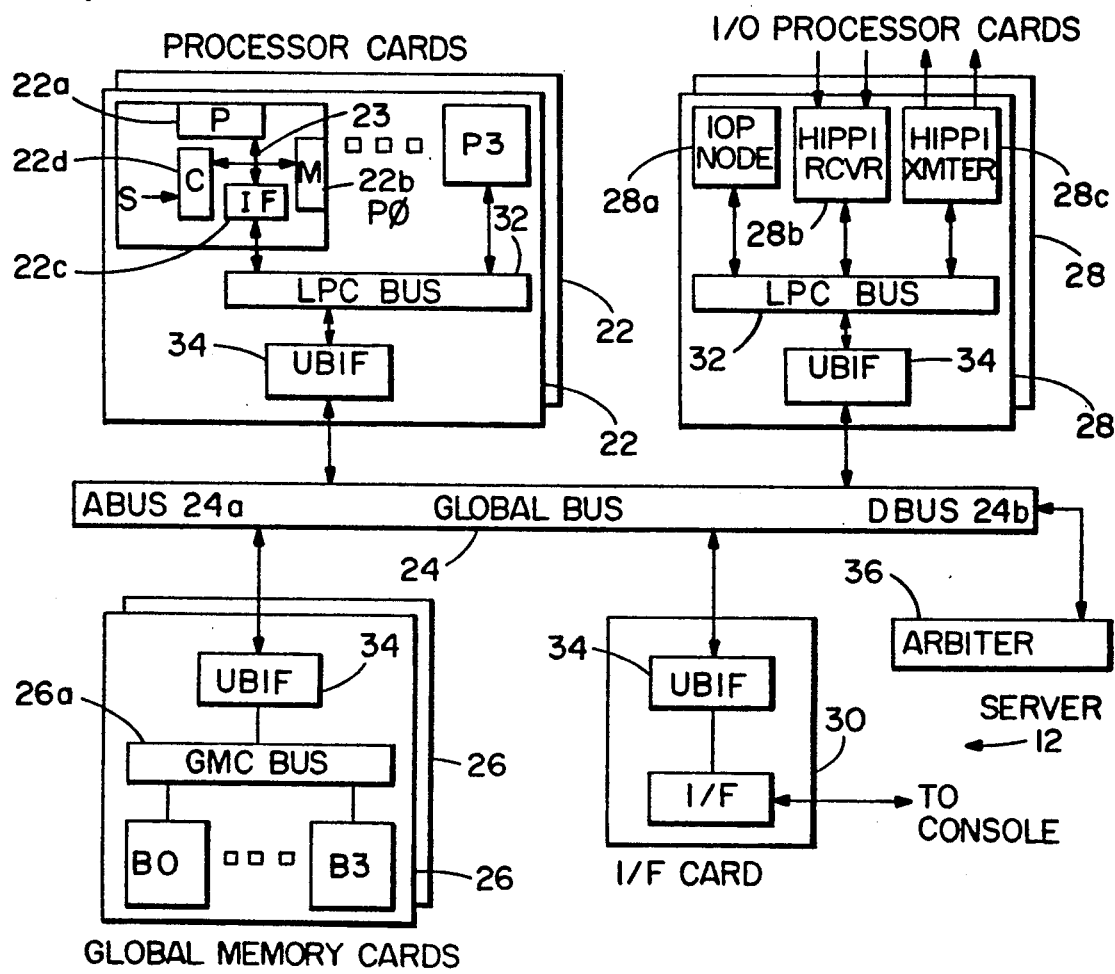
FIG. 2 is a block diagram of the system server component of FIG. 1.

Referring to FIG. 2 there is illustrated in block diagram form the server 12 of the SVS 10. Server 12 is comprised of a plurality of individual processors 22a organized as four processors (P0-P3) per printed circuit card 22. The server 12 may include up to eight cards for a total of 32 processors. Each processor card 22 includes a universal bus interface (UBIF) 34 for coupling a Local Processor Card (LPC) bus 32 to a SVS global bus 24. Also coupled to the SVS global bus 24 are a plurality of Global Memory cards 26, a plurality of I/O processor cards 28, and an interface 30 to the console 14.

More specifically, each processor card 22 includes up to four processor nodes each having a microprocessor 22a. In a present embodiment each microprocessor 22a is an i860-type device, specifically an 80860 microprocessor device manufactured by Intel Corporation (i860 is a Trademark of the Intel Corporation). Coupled to each microprocessor 22a through a node bus 23 is a local node memory 22b providing, in this embodiment, 16 megabytes (MB) of storage. Each processor node also includes a buffered interface 22c to the LPC bus 32. Additionally, each processor node includes an interface 22d to a serial bus (S). The LPC bus 32 connects multiple processor nodes to the UBIF 34 and also permits access to further shared resources.

In a present embodiment one of the processor cards 22 is capable of a peak performance of 160 million instructions per second (MIPS), or 320 million single precision floating point operations per second (MFLOPS). A fully configured system of eight processor cards 22 provides a peak performance approaching 1.28 billion instructions per second (BIPS) or 2.56 GFLOPS, assuming 40 MHz operation.

Also in a present embodiment each of the Global Memory cards 26 is configured with either 128 MB or 56 MB of random access memory with ECC. The server 12 may include up to four Global Memory cards 26. Each of the Global Memory cards 26 provides a data bandwidth of 640 MB/second in a manner that reduces a memory access latency seen by each user of the system 10. This is accomplished by partitioning the Global Memory on each memory card 26 into four memory banks (B0-B3), each of which is capable of independently performing block read cycles, page mode read or write cycles and random read or write cycles. A Global Memory Card (GMC) bus 26a enables each of the banks (B0-B3) to operate independently, while utilizing common global bus resources.

The I/O processor cards 28 each include a processor node 28a, similar to processor node 22a of the processor card 22, in addition to two HIPPI receivers 28b, and two HIPPI transmitters 28C. Each IOP 28 provides four HIPPI interfaces, each of which is capable of operation at a transfer rate of 100 MB/second. The HIPPI interfaces are employed to support high speed disk arrays, provide real-time images to HIPPI-attached frame buffers, and realize high speed communication with external devices, such as supercomputers.

The console interface 30 is partitioned into two cards, one which is found within the server 12 and one which resides in the console 14. The link between the two card allows access to the Global memory 26 and serial bus, which in turn allows access to each processor's local memory and PBIF.

The Global Bus 24 is implemented with Emitter Coupled Logic (ECL) technology for interconnecting these various components and providing a 1.28GByte/sec transfer rate.

Each SVS 10 server 12 supports up to 12 master devices (i.e. processor cards 22, I/0 processor cards 28, or Interface card 30), and up to four memory cards 26. One possible configuration includes an Interface card 30, eight processor cards 22 (or 32 processors), four Global Memory cards 26 each with 256 MBytes of storage for a total of 1024 MB of high speed memory, and one I/O processor 28 to support the high speed disk array 20, receive data from a HIPPI source, and distribute image data to HIPPI attached frame buffers 16. The console 14 provides a user interface to the SVS 10 as well as support for standard I/O devices.

As can be seen in FIG. 2 each component card of the system 10 includes one of the UBIFs 34. The UBIF 34 presents a shared, synchronous, decoupled interface to the Global Bus 24, provides local arbitration for the LPC bus 32 or GMC bus 26a, and performs all necessary handshaking and retry sequencing with the Global bus 24. In a present embodiment the UBIF 34 provides bidirectional, pipelined buffering in support of to four local master devices, such as processors 22a, or up to four slave devices, such as the memory banks B1-B4. The UBIF 34 supports data bus widths between eight bits and 256 bits and provides a peak data transfer rate of 1.28 Gbytes/second between the Local Bus 32 and the Global Bus 24, assuming 40 MHz bus operation (25 nanosecond bus cycle). The operation of the UBIF 34 is described in the above mentioned commonly assigned U.S. Pat. application Ser. No. 07/734,206, filed Jul. 22, 1991 "A Universal Buffered Interface for Coupling Multiple Processors, Memory Units, and I/O Interface to a Common High-Speed Interconnect" A. Garcia.

Figure 3:
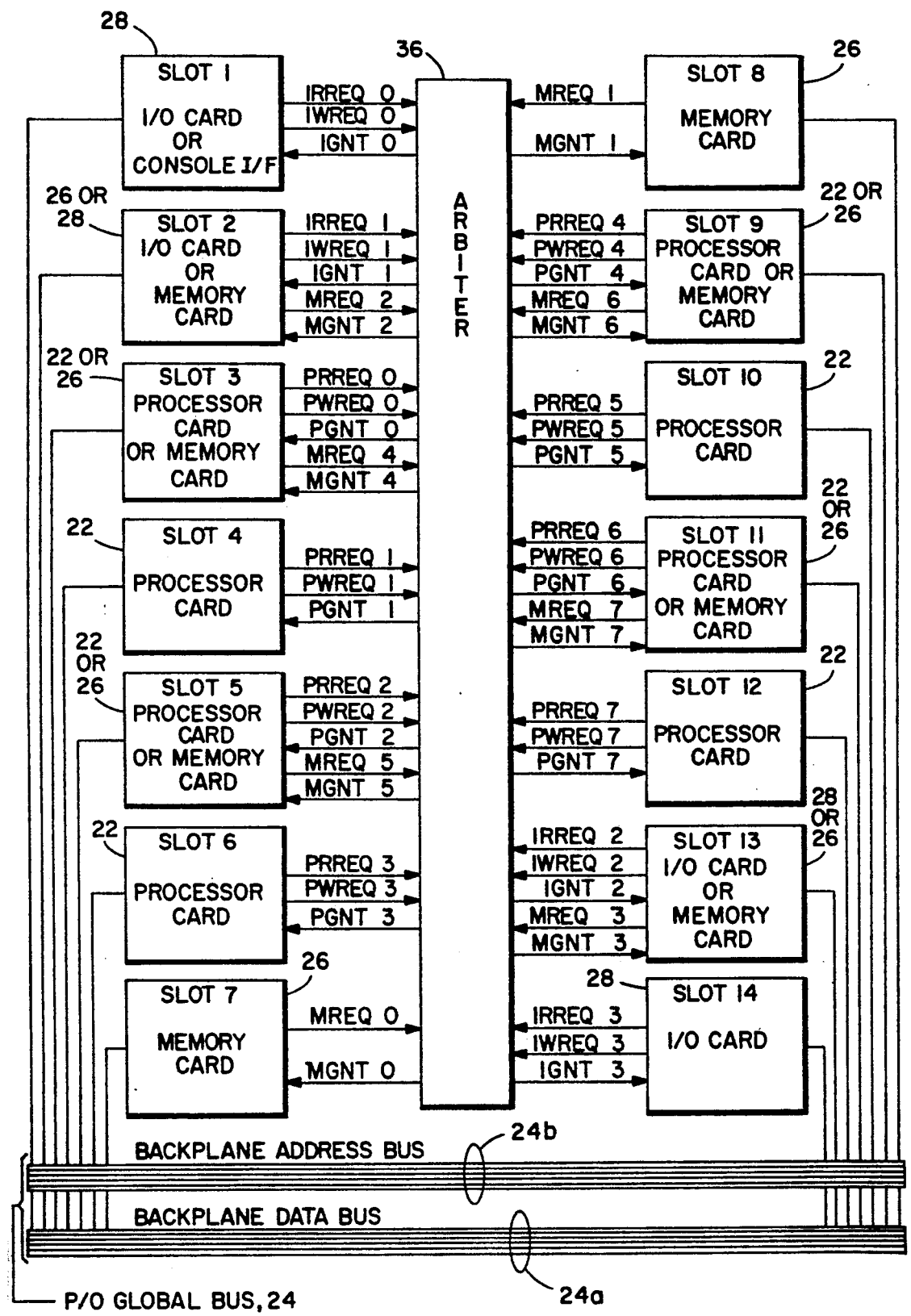
FIG. 3 depicts an overall connectivity of the Arbiter, backplane buses, and various card slots.

In accordance with the invention the system 10 also includes an Arbiter 36 that is coupled to the Global Bus 24. The overall connectivity of the Arbiter 36, the Global Bus 24, and the various bus agents associated with card slots, as implemented in the SVS 10, is shown in FIG. 3.

Figure 4:
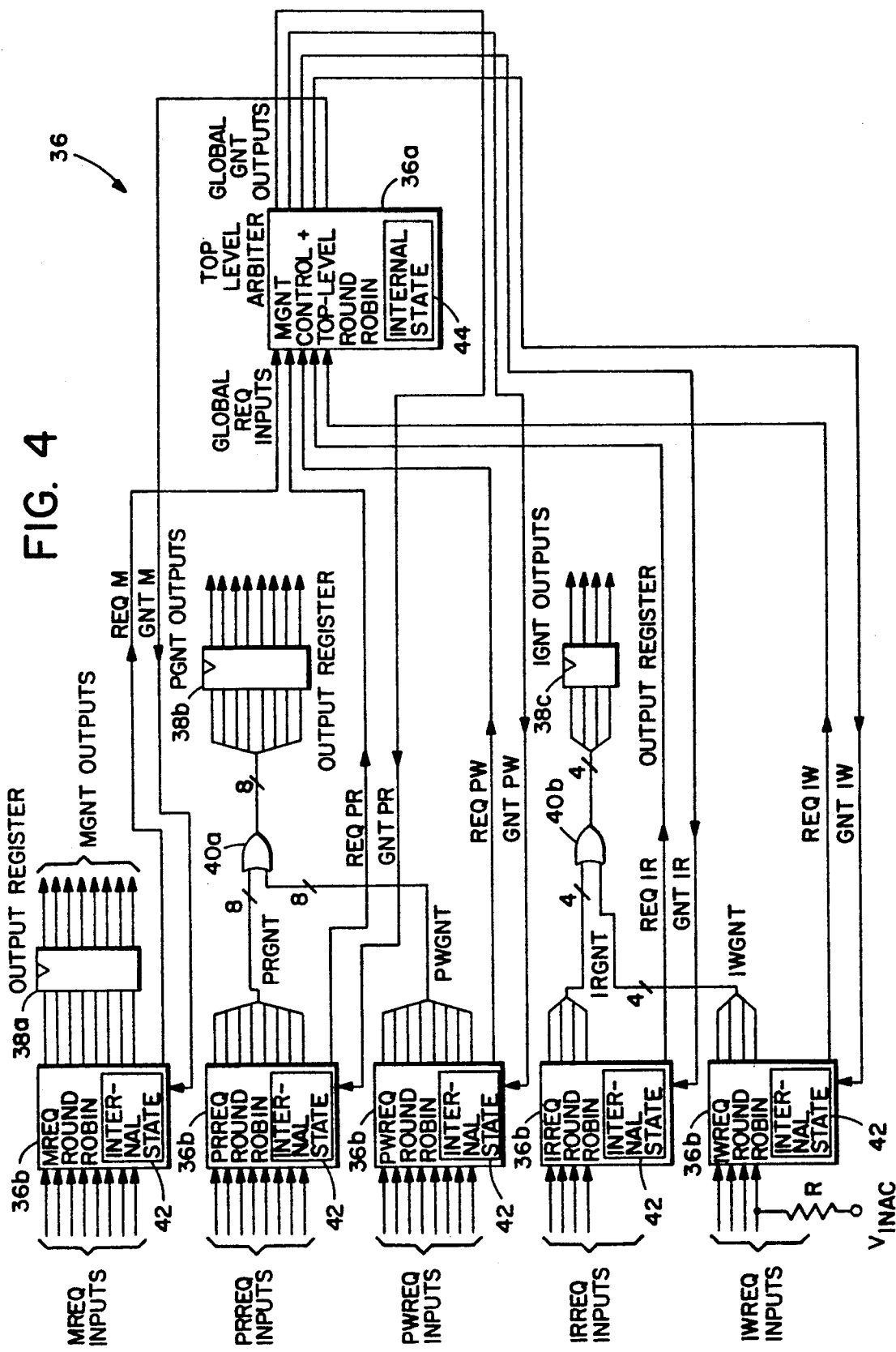
FIG. 4 is a detailed block diagram of the two level Arbiter of the invention.

A detailed block diagram of a presently preferred embodiment of the two-level Arbiter 36 is shown in FIG. 4. A top-level Arbiter 36a grants requests from five bottom-level Arbiter modules 36b, which in turn grant requests from each individual card plugged into the Global Bus 24.

The Arbiter 36 receives and services five types of bus requests: computational processor 22 read requests (PRREQ), computational processor 22 write requests (PWREQ), I/0 processor read requests (IRREQ), I/0 processor write requests (IWREQ), and memory response requests (MRREQ). The Arbiter 36 issues three types of bus grants: computational processor grants (PGNT), I/O processor grants (IGNT), and memory response grants (MGNT).

Each computational processor card 22 outputs two signal lines, specifically PRREQ and PWREQ, to the Arbiter 36, and receives a PGNT signal line from the Arbiter 36. Each I/0 processor card 28 outputs IRREQ and IWREQ signal lines to the Arbiter 36 and receives an IGNT signal line from the Arbiter 36. Each memory card 26 outputs a MREQ signal line to the Arbiter 36 and receives therefrom a MGNT signal line. These various inputs and outputs to the Arbiter 36 are shown in FIGS. 3 and 4. As can be seen in FIG. 4 each of the bottom-level arbiters 36b and the top-level Arbiter 36a includes an internal state machine 42 and 44, respectively. As can also be seen in FIG. 4, the Arbiter 36 includes output registers 38a, 38b, and 38c for registering the output signals lines MGNT, PGNT, and IGNT, respectively. Logic gates 40a and 40b operate as described below. A processor card 22 must assert its PRREQ line to request access to the ABUS 24a. In response, the Arbiter 36 asserts the processor card's PGNT signal starting on some subsequent system clock edge and lasting for one cycle. The signal is intended to be used as an output enable for ABUS 24a drivers on the processor card 22.

A processor card 22 must assert its PWREQ line to request access to the ABUS 24a and the DBUS 24b. The Arbiter 36 asserts the processor's PGNT signal starting on some subsequent system clock edge and lasting for one cycle. The signal is again used as an output enable to drive the address portion during a write cycle. During the following system clock cycle, the processor card 22 drives the DBUS 24b. A one-clock delayed write grant signal may be used as an output enable for processor card 22 DBUS 24b drivers. The DBUS 24b access is delayed one cycle so that the other bus agents on the Global Bus 24 have sufficient time to decode the address and determine whether to latch the data. The fact that the same grant line, PGNT, is used to grant this request is a simplification made possible by the fact that a processor card 22 is restrained from ever simultaneously asserting PRREQ and PWREQ. The two bottom-level processor request Arbiters 36b internally compute two signals PRGNT and PWGNT, and employ logic gate 40a to OR these signals together to derive the registered PGNT outputs.

The IRREQ and IWREQ signals are used by the I/O cards 28 in a manner identical to the way processor cards 22 use PRREQ and PWREQ. The grant signal for both of these requests is IGNT. In a manner as described above, the I/O processor request bottom-level Arbiters 36b internally compute two signals IRGNT and IWGNT, and employ the logic gate 40b to OR these signals together to derive the registered IGNT outputs.

Having two such classes of requests and grants enables the Arbiter 36 to be fair to both I/O processor cards 28 and computational processor cards 22 by arbitrating them separately, as described below.

The MREQ signal is used by the memory cards 26 to gain access to the DBUS 24b. The Arbiter 36 responds with a grant signal, MGNT, starting on some subsequent system clock edge and lasting for one cycle. The MGNT signal is intended to be used as an output enable for DBUS 24b drivers on the selected memory card 26.

Two-Level Round Robin Arbitration

In accordance with the invention the Arbiter 36 employs a two-level round robin technique of granting four separate read requests and write requests (computational processors 22 and I/O processors 28), in addition to a memory request. This provides the Arbiter 36 the capability to prevent one type of request from monopolizing the Global Bus 24. For example, intensive I/O operation would cause many I/O cards 28 to constantly assert IRREQ or IWREQ. A one-level round robin Arbiter would be incapable of giving any one processor card 22 a fair share of the Global Bus 24 bandwidth, as it would be contending with several I/O cards 28 for access to the Global Bus 24. Similarly, a compute-intensive operation involving multiple processor cards 22 may effectively choke off requests from a single I/O card 28.

In accordance with the invention, on every clock cycle a two-step process is employed to determine which bus agent is to be granted access to the ABUS 24a and the DBUS 24b. First, the top-level Arbiter 36a selects which type of request will be granted. The top-level Arbiter then signals the corresponding bottom-level Arbiter 36b. The selected bottom-level Arbiter 36b then selects which of the requesting bus agents is to receive the grant. The state machines 42 of the bottom-level Arbiters 36b operate in accordance with a round robin technique. The state machine 44 of the top-level Arbiter 36b operates in accordance with a modified round robin technique, as will be described.

As an example, the top-level Arbiter 36a may choose to grant a read request to a processor card 22 by outputting the signal REQ_PR. The bottom-level Arbiter 36b may then choose the fourth such processor card 22 (PRREQ 4) to receive the grant. As was stated, both the top-level Arbiter 36a and the bottom-level Arbiter 36b operate by means of a round robin technique or a modified round robin technique. As employed herein a round robin technique is an arbitration technique in which each requestor is, in turn, given priority over other requestors in a circular sequence. The priority is adjusted, on every clock cycle if required, such that a requester most recently granted bus access has a lowest priority when a next choice is made.

As depicted in the state transition diagram of FIG. 5, for the top-level Arbiter 36a, round-robin priority is allotted circularly to four types of read and write requests in the following order: PWREQ, PRREQ, IWREQ, and IRREQ. The fifth type of request, MREQ, is handled in a different manner as described below.

The system RESET input returns the state machine to an arbitrarily chosen known state, TOP_PW, and deactivates all grants. Five request inputs are supplied from the bottom-level round robin arbiters 36b. These inputs are designated REQ_PR, REQ_PW, REQ_IR, REQ_IW, and REQ_M. Five corresponding grant outputs return to the bottom-level round robin arbiters 36b. These outputs are designated GNT_PR, GNT_PW, GNT_IR, GNT_IW, and GNT_M. Each bottom-level round robin Arbiter 36b asserts an associated one of the requests whenever it receives a request from a bus agent. For example, whenever any computational processor card 22 asserts a PRREQ line, REQ_PR is asserted by the bottom-level Arbiter 36b that is coupled to all of the PRREQ input signal lines.

Figure 5:
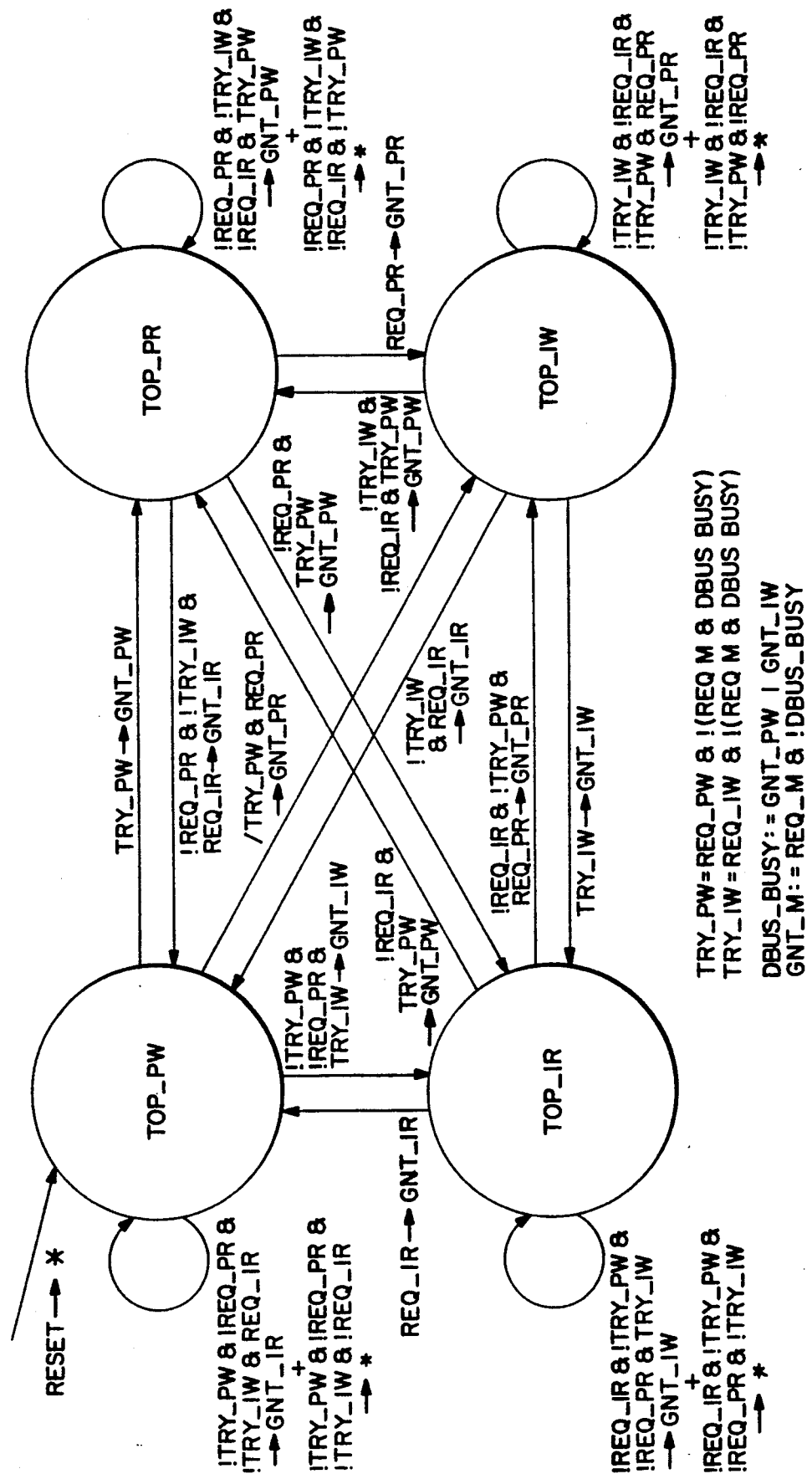
FIG. 5 is a state transition diagram illustrating the operation of a top-level Arbiter in response to input request signals.

In reference to the state transition diagram of FIG. 5 there is first considered the state TOP_PW. In this state, the priorities are (in order from highest to lowest) REQ_PW, REQ_PR, REQ_IW, REQ_IR. If a REQ_PW is present it is granted, and the top-level Arbiter 36a state machine advances to state TOP_PR, in which state the priorities are ordered as REQ_PR, REQ_IW, REQ_IR, and REQ_PW. If REQ_PW is not present but REQ_PR is, the REQ_PR is granted and the state machine advances to state TOP_IW, in which state the priorities are ordered as REQ_IW, REQ_IR, REQ_PW, and REQ_PR. If neither REQ_PW nor REQ_PR are present, but REQ_IW is, the REQ_IW is granted and the state machine advances to state TOP_IR, in which state the priorities are ordered as REQ_IR, REQ_PW, REQ_PR, and REQ_IW. If only REQ_IR is present, the state machine grants the REQ_IR and remains in state TOP_PW. If no requests are present, the state machine remains in a current state.

As was previously noted, arbitration of memory requests is accomplished differently than is the arbitration of processor 22 or I/O 28 requests. Specifically, the Arbiter 36 may grant a memory response request at the same time as it grants a read or write request. The only exception to this procedure is on a cycle following a write grant, in that it is known that the DBUS 24b is busy due to the write operation. Memory request granting is thus handled substantially independently from read and write granting. A single state bit designated DBUS_BUSY is employed to record if a write access was granted on a previous cycle. DBUS_BUSY is generated by the state equation shown in FIG. 5.

The Arbiter 36 assigns memory response requests a highest priority. Thus, if a write request was granted on the previous cycle, and a memory request is received, the Arbiter 36 delays the generation of another write grant so that the DBUS 24b will be assured to be free for the memory grant on a next cycle. It should be noted that the state diagram of FIG. 5 is modified from that expected for a purely round robin arbitration technique in order to simultaneously process memory requests. Thus, the expected signals REQ_PW and REQ_IW are replaced by TRY_PW and TRY_IW. These two signals may be considered to be equivalent to REQ_PW and REQ_IW, respectively, except that they are conditioned on DBUS_BUSY and REQ_M, as shown in the state equations depicted in FIG. 5. If both DBUS BUSY and REQ M are present, a REQ_PW or REQ_IW is masked out, or inhibited, for one cycle.

One novel consequence of assigning memory requests the highest priority is the provision of a well-balanced and highly maximized utilization of ABUS 24a and DBUS 24b. Each write request utilizes ABUS 24a and DBUS 24b once, and each read request utilizes the ABUS 24a once and is matched by a subsequent memory return request which also utilizes the DBUS 24b but once. Thus, both types of bus operations equally utilize the two buses.

One characteristic of the Arbiter 36 is that resistors (R) on the Arbiter 36 input lines (only one of which is shown in FIG. 4) are connected so as to pull the request lines toward an inactive logic level ($V_{INAC}$). As a result, an empty Global Bus 24 slot behaves as if an inactive, non-requesting card were plugged into the slot. Thus, the Arbiter 36 does not require reconfiguration when the configuration of cards in the system 10 is altered.

Also, by coupling more than one type of request and grant line to certain of the slots, more than one type of card may be plugged into the slot. The request and grant lines running to the 14 card slots of the SVS 10 are specifically shown in FIG. 3. By example, using this configuration a memory card 26 may be plugged into any of slots 2, 3, 5, 7, 8, 9, 11, or 13, a processor card 22 may be plugged into any of the slots 3, 4, 5, 6, 9, 10, 11, or 12, and an I/O card 28 may be plugged into any of the slots 1, 2, 13, or 14.

In a presently preferred embodiment the Arbiter 36 supports zero to eight processor cards 22 (PRREQ,P-WREQ), zero to four I/0 cards 28 (IRREQ/IWREQ) and zero to eight memory cards 26 (MREQ). However, it should be realized that upper limits of the numbers of supported bus agents are not limited to four or eight. The upper limits are instead governed by the size of the bottom-level Arbiter 36b round robin loops.

In accordance with the invention, due to the dual-level, round robin arbitration technique, no one type of bus request or bus requestor may monopolize the common bus 24. Also, high priority is given to memory card 26 requests, thereby balancing the utilization of the ABUS 24a and the DBUS 24b. Finally, configuration of the Arbiter 36 is simple and automatic.

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. In a data processing system having a plurality of groups of bus agents coupled to a common bus, the common bus including at least a first group of functionally-related signal lines and a second group of functionally-related signal lines, an arbiter for granting use of the common bus to the bus agents, the arbiter comprising:

top-level arbiter means for receiving bus requests generated for the plurality of groups of bus agents, the top-level arbiter means including a first state machine means, the first state machine means being responsive to the bus requests, and operating in accordance with a modified round robin arbitration technique, for generating a plurality of bus grant signal outputs, individual ones of the bus grant signal outputs being generated for individual ones of the groups of bus agents; and for each of the groups of bus agents, bottom level arbiter means having an input for receiving the bus grant signal that is generated for the group of bus agents, the bottom-level arbiter means including second state machine means, responsive to the receipt of the bus grant signal and operating in accordance with a round robin arbitration technique, for selecting one member of the group of bus agents to receive access to the common bus, wherein said top-level arbiter means outputs a first bus grant signal for enabling a corresponding one of said bottom-level arbiter means to enable access by a first bus agent to one of said first or second sets of functionally-related signal lines, said top-level arbiter means further outputting a second bus grant signal, simultaneously with the outputting of the first bus grant signal, for enabling a different corresponding one of said bottom-level arbiter means to enable access by a second bus agent to another one of said first or second sets of functionally-related signal lines.

2. An arbiter as set forth in claim 1 wherein a first group of bus agents is comprised of at least one computational processor means, wherein a second group of bus agents is comprised of at least one I/O processor means, and wherein a third group of bus agents is comprised of at least one memory means.

3. An arbiter as set forth in claim 2 wherein the bus requests include: computational processor read requests (PRREQ), computational processor write requests (PWREQ), I/O processor read requests (IRREQ), I/O processor write requests (IWREQ), and memory means response requests (MRREQ).

4. An arbiter as set forth in claim 3 wherein the bus grant signal outputs include: computational processor bus grants (PGNT), I/O processor bus grants (IGNT), and memory means response grants (MGNT).

5. An arbiter as set forth in claim 3 wherein the bus requests are ordered by the top-level arbiter means in the following priority sequence: PWREQ, PRREQ, IWREQ, and IRREQ.

6. An arbiter as set forth in claim 5 wherein an occurrence of a MRREQ is assigned a higher priority by the top-level arbiter means than a pending PWREQ, PRREQ, IWREQ, or IRREQ.

7. In a data processing system having a plurality of groups of bus agents coupled to a common bus, an arbiter for granting use of the common bus to the bus agents, the arbiter comprising:

top-level arbiter means for receiving bus requests generated for the plurality of groups of bus agents, the top-level arbiter means including a first state machine means, the first state machine means being responsive to the bus requests, and operating in accordance with a modified round robin arbitration technique, for generating a plurality of bus grant signal outputs, individual ones of the bus grant signal outputs being generated for individual ones of the groups of bus agents; and for each of the groups of bus agents, bottom-level arbiter means having an input for receiving the bus grant signal that is generated for the group of bus agents, the bottom-level arbiter means including second state machine means, responsive to the receipt of the bus grant signal and operating in accordance with a round robin arbitration technique, for selecting one member of the group of bus agents to receive access to the common bus;

wherein the common bus includes a set of address signal lines and a set of data signal lines, and wherein the top-level arbiter means state machine means generates a first bus grant signal output for one group of signal lines and also simultaneously generates a second bus grant signal output for another one of the groups of bus agents to enable access to the set of data signal lines.

8. In a data processing system having a plurality of groups of bus agents coupled to a common bus, an arbiter for granting use of the common bus to the bus agents, the arbiter comprising:

top-level arbiter means for receiving bus requests generated for the plurality of groups of bus agents, the top-level arbiter means including a first state machine means, the first state machine means being responsive to the bus requests, and operating in accordance with a modified round robin arbitration technique, for generating a plurality of bus grant signal outputs, individual ones of the bus grant signal outputs being generated for individual ones of the groups of bus agents; and for each of the groups of bus agents, bottom-level arbiter means having an input for receiving the bus grant signal that is generated for the group of bus agents, the bottom-level arbiter means including second state machine means, responsive to the receipt of the bus grant signal and operating in accordance with a round robin arbitration technique, for selecting one member of the group of bus agents to receive access to the common bus;

wherein a first group of bus agents is comprised of at least one computational processor means, wherein a second group of bus agents is comprised of at least one I/O processor means, and wherein a third group of bus agents is comprised of at least one memory means; and wherein an occurrence of a request for access to the common bus by the memory means is assigned a higher priority by the top-level arbiter means than a request by one of the computational processor means or one of the I/O processor means.

9. In a multi-processor data processing system having a plurality of groups of bus agents coupled to a common bus, each of the groups of bus agents comprising at least one member, an arbiter for granting use of the common bus to the bus agents, the arbiter comprising:

for each of the groups of bus agents, bottom-level arbiter means having a plurality of inputs for receiving requests for access to the common bus from individual ones of the members of the group and an output for outputting a bus request signal, the bottom level arbiter means further having a bus grant input for receiving a bus grant signal and including first state machine means, the first state machine means being responsive to the receipt of the bus grant signal, and to the received requests for access to the common bus, for operating in accordance with a round robin arbitration technique to select one of the members of the group for receiving access to the common bus; and top-level arbiter means having inputs coupled to the bottom-level arbiter means for receiving the bus request signal output from each of the bottom-level arbiter means, the top-level arbiter means including a second state machine means, operating in accordance with a modified round robin arbitration technique, for generating, in response to the received bus request signals, a plurality of bus grant signals, individual ones of the bus grant signals being coupled to the bus grant input of one of the bottom-level arbiter means.

10. An arbiter as set forth in claim 9 wherein each individual member of each of the groups of bus agents performs a function, within the multi-processor data processing system, that is similar to a function performed by other members of the group of bus agents.

11. An arbiter as set forth in claim 9 wherein a first group of bus agents is comprised of at least one computational processor means, wherein a second group of bus agents is comprised of at least one I/O processor means, and wherein a third group of bus agents is comprised of at least one memory means.

12. An arbiter as set forth in claim 11 wherein the bus requests include: computational processor read requests (PRREQ), computational processor write requests (PWREQ), I/O processor read requests (IRREQ), I/O processor write requests (IWREQ), and memory means response requests (MRREQ); and wherein the bus grant signal includes: computational processor read grants (GNT_PR), computational processor write grants (GNT_PW), I/O processor read grants (GNT_IR), I/O processor write grants (GNT_IW), and memory means response grants (GNT_M).

13. An arbiter as set forth in claim 12 wherein the bus requests are ordered by the top-level arbiter means in the following priority sequence: PWREQ, PRREQ, IWREQ, and IRREQ.

14. An arbiter as set forth in claim 13 wherein an occurrence of a MRREQ is assigned a higher priority by the top-level arbiter means than a pending PWREQ, PRREQ, IWREQ, or IRREQ.

15. An arbiter as set forth in claim 9 wherein the common bus includes a set of address signal lines and a set of data signal lines, and wherein the top-level arbiter means state machine means generates a first bus grant signal for one group of bus agents to enable access to the set of address signal lines and also simultaneously generates a second gus grant signal for another one of the groups of bus agents to enable access to the set of data signal lines.

16. In a data processing system having a plurality of groups of bus agents coupled to a common bus, each of said plurality of groups of bus agents having at least one member, a method of operating an arbiter for granting use of the common bus to the bus agents, comprising the steps of:

receiving bus requests with a plurality of bottom-level arbiter means, each of the plurality of bottom-level arbiter means having inputs for receiving requests for access to the common bus from individual ones of the members of one of the groups of bus agents;

generating, with each of the bottom-level arbiter means receiving at least one bus request, a group bus request, the group bus requests including: computational processor read requests (PRREQ), computational processor write requests (PWREQ), I/O processor read requests (IRREQ), I/O processor write requests (IWREQ), and memory means response requests (MRREQ).

receiving the group bus requests with a top-level arbiter means;

generating, in accordance with a modified round robin arbitration technique, one or more group bus grant signals in response to the received group bus requests, the group bus grant signals including: computational processor read grants (GNT_PR), computational processor write grants (GNT_PW), I/O processor read grants (GNT_IR), I/O processor write grants (GNT_IW), and memory means response grants (GNT_M);

receiving the one or more group bus grant signals with the bottom-level arbiter means; and generating, in accordance with a round robin arbitration technique, one or more individual bus grant signals for selecting one of the members of one or more of the groups of bus agents for receiving access to the common bus.

17. A method as set forth in claim 16 wherein the bus requests are ordered by the top-level arbiter means in the following priority sequence: PWREQ, PRREQ, IWREQ, and IRREQ.

18. A method as set forth in claim 17 wherein the modified round robin arbitration technique operates such that an occurrence of a MRREQ is assigned by the top-level arbiter means a higher priority than a pending PWREQ, PRREQ, IWREQ, or IRREQ.

19. In a multi-processor data processing system having a plurality of groups of bus agents coupled to a common bus, each of the groups of bus agents comprising at least one member, an arbiter for granting use of the common bus to the bus agents, the arbiter comprising:

for each of the groups of bus agents, bottom-level arbiter means having a plurality of inputs for receiving requests for access to the common bus from individual ones of the members of the group and an output for outputting a bus request signal, the bottom-level arbiter means further having a bus grant input for receiving a bus grant signal and including first state machine means, the first state machine means being responsive to the receipt of the bus grant signal, and to the received request for access to the common bus, for operating in accordance with a round robin arbitration technique to select one of the members of the group for receiving access to the common bus; and to-level arbiter means having inputs coupled to the bottom-level arbiter means for receiving the bus request signal output from each of the bottom-level arbiter means, the top-level arbiter means including a second state machine means, operating in accordance with a modified round robin arbitration technique, for generating, in response to the received bus request signals, a plurality of bus grant signals, individual ones of the bus grant signals being coupled to the bus grant input of one of the bottom-level arbiter means;

wherein each of the bus agents is coupled to the common bus at one of a plurality of coupling locations, wherein the requests for access to the common bus are conveyed by signal lines of the common bus, wherein the plurality of inputs of each of the bottom-level arbiter means are coupled to the signal lines of the common bus for receiving the bus requests therefrom, and wherein the signal lines are arranged within the common bus such that at least one of the plurality of coupling locations is physically adapted for coupling either to a bus agent that is a member of a first group or to a bus agent that is a member of a second group.

20. In a multi-processor data processing system having a plurality of groups of bus agents coupled to a common bus, each of the groups of bus agents comprising at least one member, an arbiter for granting use of the common bus to the bus agents, the arbiter comprising:

for each of the groups of bus agents, bottom-level arbiter means having a plurality of inputs for receiving requests for access to the common bus from individual ones of the members of the group and an output for outputting a bus request signal, the bottom-level arbiter means further having a bus grant input for receiving a bus grant signal and including first state machine means, the first state machine means being responsive to the receipt of the bus grant signal, and to the received requests for access to the common bus, for operating in accordance with a round robin arbitration technique to select one of the members of the group for receiving access to the common bus; and top-level arbiter means having inputs coupled to the bottom-level arbiter means for receiving the bus request signal output from each of the bottom-level arbiter means, the top-level arbiter means including a second state machine means, operating in accordance with a modified round robin arbitration technique, for generating, in response to the received bus request signals, a plurality of bus grant signals, individual ones of the bus grant signals being coupled to the bus grant input of one of the bottom-level arbiter means;

wherein the requests for access to the common bus are conveyed by signal lines of the common bus, wherein the plurality of inputs of each of the bottom-level arbiter means are coupled to the signal lines of the common bus for receiving the bus requests therefrom, and wherein individual ones of the signal lines are each coupled to means for establishing a level on the signal line, in response to a bus agent not being coupled to the signal line, that indicates that a request for access to the common bus is not being conveyed through the signal line.

* * * * *

UNITED STATES PATENT AND TRADEMARK OFFICE
CERTIFICATE OF CORRECTION

PATENT NO. : 5,280,591
DATED : January 18, 1994
INVENTOR(S) : Garcia et al

It is certified that error appears in the above-indentified patent and that said Letters Patent is hereby corrected as shown below:

```
Column 10: Claim 7, line 20, after "of" should appear --bus agents to
enable access to the set of address--.
Column 11, Claim 12, line 37, "signal" should be --signals--.
           Claim 12, line 37, "includes" should be --include--.
           Claim 15, line 56, "gus" should be --bus--.
Column 12, Claim 16, line 10, the period "." should be a semicolon--;--.
           Claim 16, line 22, "GNT_M" should be --GNT_M--.

Claim 19, line 60, "to-level" should be --top-level--.
```

Signed and Sealed this

Thirty-first Day of May, 1994

Attest:

BRUCE LEHMAN

*Attesting Officer*   *Commissioner of Patents and Trademarks*